Figure 4:
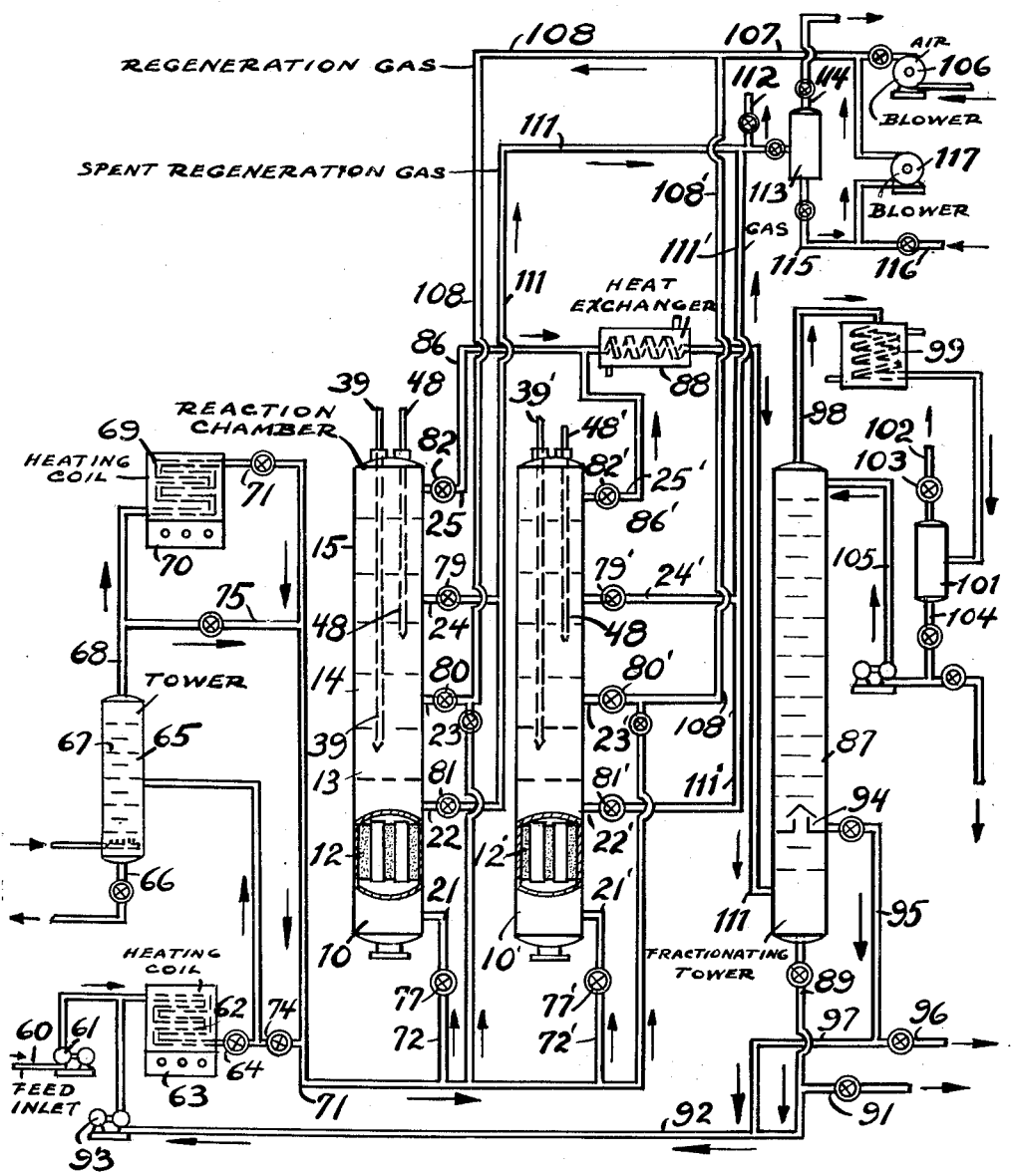

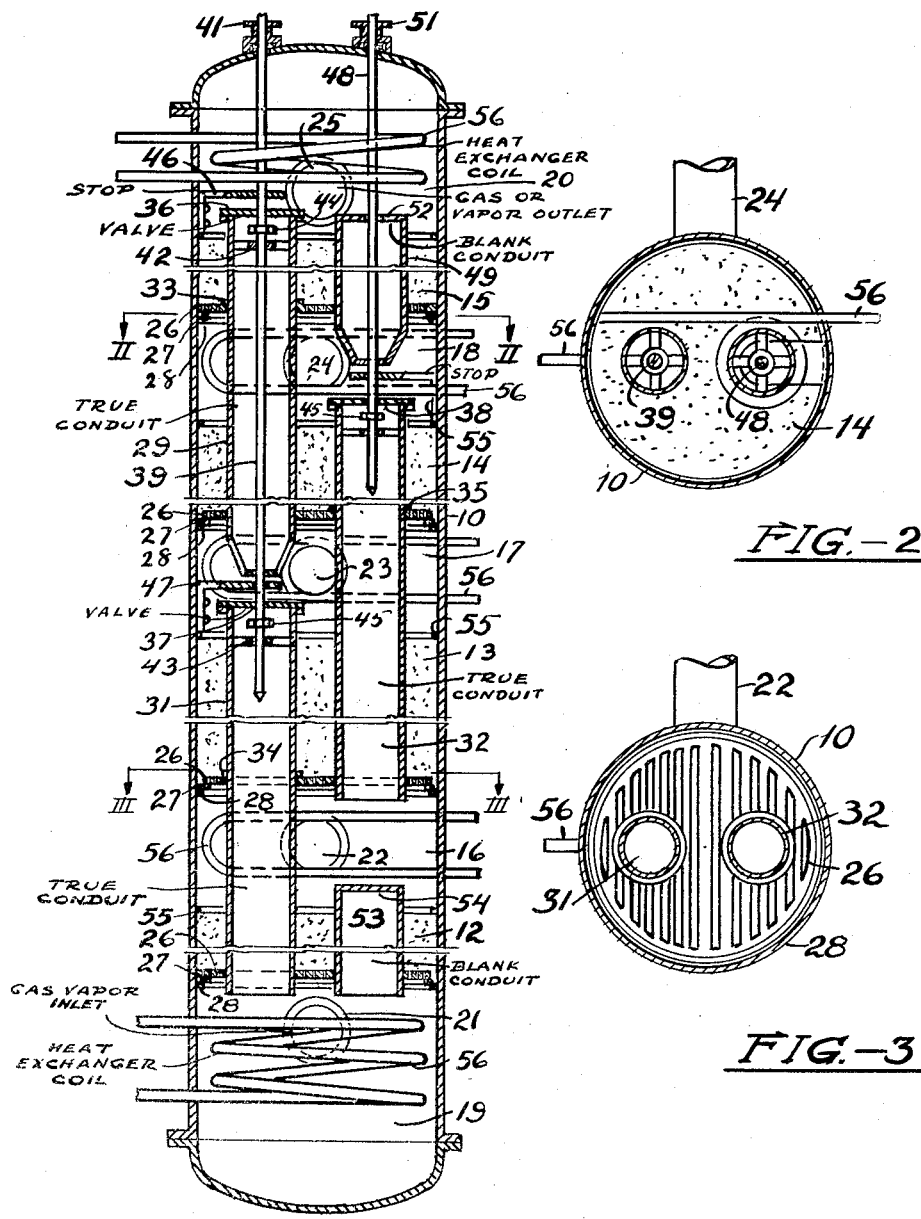

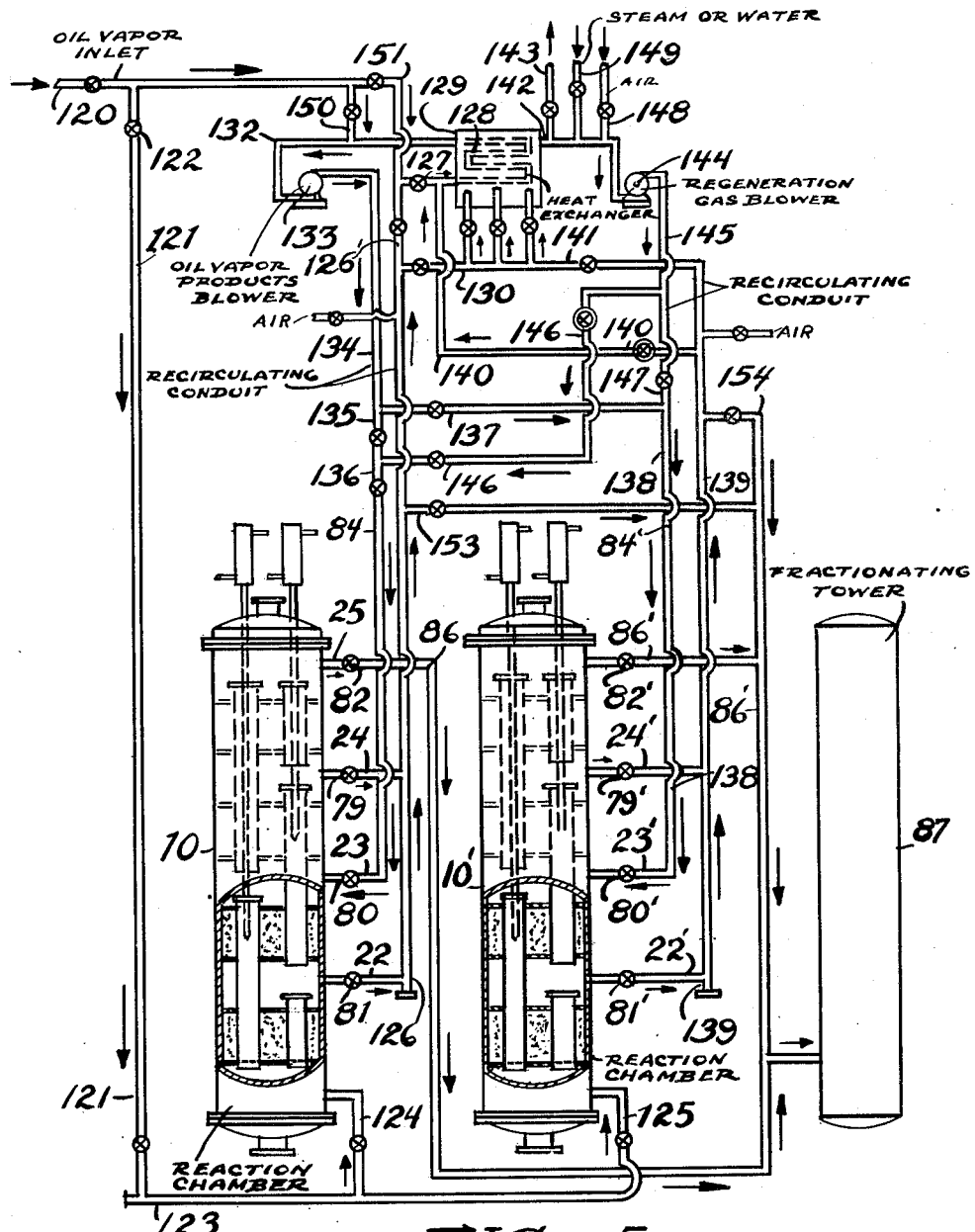

Patented Mar. 23, 1948

2,438,467

UNITED STATES PATENT OFFICE 2,438,467

CATALYTIC CONVERSION OF HYDROCARBONS

Charles W. Tyson, Summit, Herbert G. M. Fischer, Westfield, and Eger V. Murphree, Summit, N. J., assignors to Standard Oil Development Company, a corporation of Delaware Original application October 15, 1938, Serial No. 235,232. Divided and this application January 16, 1943, Serial No. 472,550

5 Claims. (Cl. 196—49)

This invention relates to a method of carrying out reactions in the presence of solid contact materials which become fouled with carbonaceous deposits which must be periodically regenerated to remove such deposits. The invention pertains more particularly to a process for accomplishing the reaction and regeneration of the contact mass alternately in the same reaction chamber.

While our invention in some of its broadest aspects will have a broader application as will appear hereinafter, it is particularly adapted for the catalytic conversion of hydrocarbon oil in the presence of solid adsorbent contact material. During this conversion treatment, the surface of the contact mass becomes fouled more or less rapidly with carbonaceous deposits which reduce the activity of the contact material and finally necessitates discontinuance of the process. The activity of this contact material may be restored by subjecting it to a regenerating treatment which will remove such carbonaceous deposits. This can be accomplished by passing an oxidizing gas, such as air or air in admixture with diluent gases, such as steam or combustion products, through the catalyst bed to burn the carbonaceous deposits therefrom.

When regenerating in this manner, it has been found that with certain types of materials, such as adsorbent clays, excessive temperatures during the burning operation tend to reduce permanently the activity of the catalyst.

Since the regeneration of the catalyst is a highly exothermic reaction, difficulties have been encountered in maintaining the proper temperature control during the regenerating period.

In processes of this character involving periodic regeneration of the contact mass, it is considered more economical to carry out the regeneration in the same chamber in which the reaction is accomplished so as to avoid the additional expense required to transfer the mass to and from the reaction chamber. When carrying out the regeneration within the reaction chamber, however, the reaction period must be periodically interrupted for a time sufficient to accomplish the regeneration. This results in a reduction in capacity of the equipment to produce a given amount of desired product within a given time. It will therefore be apparent that capacity of the equipment is limited by the time required to accomplish the regeneration and it is desirable to reduce the regenerating period to a minimum.

In operations involving alternate reacting and regenerating periods of the character mentioned, the conditions maintained during the two periods differ widely. For example, during the catalytic cracking of hydrocarbon oils, the velocity of gases passing through the contact mass under optimum conditions is of a different order than the velocity of regenerating gases necessary to accomplish rapid regeneration. As a further example, during the cracking period there is a consumption of heat due to the endothermic heat of reaction whereas during the regenerating period a large amount of heat is liberated which must be removed rapidly to avoid impairment of the activity of the contact mass.

The widely different conditions prevailing during the reacting and regenerating periods present complex problems in constructing reaction chambers which will permit proper and effective control of both periods.

One of the important objects of the invention is to provide an improved method of carrying out catalytic reactions.

Another important object of the invention is to provide an improved process for carrying out catalytic reactions in which the catalyst mass is subjected to periodic regenerating treatment.

A further object of the invention is to provide an improved method of catalytic cracking of oils in which the vapors undergoing cracking are recycled through certain of the catalyst beds in the cracking chamber.

Another more detailed object of the invention is to provide an improved process for intermittent catalytic reaction and catalyst regeneration in which it will permit effective control of temperature during the reaction and regenerating periods.

Other more specific objects and advantages of our invention will be apparent from the more detailed description hereinafter.

The invention will be best understood by reference to the accompanying drawings in which Fig. 1 is a vertical sectional view of the reaction chamber constructed in accordance with the invention. Fig. 4 is a partly diagrammatic illustration of a more complete apparatus for cracking oil in which the reaction chambers shown in Fig. 1 are embodied, and Fig. 5 is a further modification of the apparatus constituting one phase of the invention.

Referring to Figs. 1, 2 and 3, the reference number 10 designates a reaction chamber containing a plurality of vertically spaced beds of solid catalyst material, 12, 13, 14 and 15, separated by vapor spaces 16, 17 and 18 respectively. Additional vapor spaces 19 and 20 are provided at the bottom and top of the chamber. Communicating with the separate vapor zones are conduits 21 to 25 which may be used for the introduction or removal of gases from the chamber. For convenience, four separate catalyst beds are shown. It will be understood, however, that the invention is not restricted to this number as any desired number may be used. Each of the catalyst beds 12 to 15 is supported on a perforated grid plate 26, which is held in position by an inwardly extending circumferential flange 27 secured to the wall of the reaction chamber. To facilitate the introduction of the grid plates from the ends of the chamber, the grid plates are of a diameter slightly less than the inner diameter of the flanges 27 and are locked in position after insertion by an intervening segmental ring 28 interposed between the grid plate and the flange 27.

The reaction chamber is provided with a longitudinal conduit 29 extending through the two upper beds of catalyst 14 and 15 and forming a vapor passage between the top vapor zone 20 and the middle vapor zone 17. A second longitudinal conduit 31 extends downwardly through the two lower catalyst beds 12 and 13 and forms a vapor passage between the lower vapor zone 19 and the middle vapor zone 17. A third conduit 32 extends through the two intermediate beds 13 and 14 and provides vapor communication between the upper intermediate vapor zone 18 and the lower intermediate vapor zone 16.

The vapor conduits 29, 31 and 32 are each provided with outwardly extending circumferential supporting flanges 33, 34 and 35 respectively, intermediate their ends, engaging the grid plates 26. By supporting the conduits intermediate their ends in this manner, the conduits are free to expand or contract longitudinally in both directions with varying temperature conditions.

The conduits 29, 31 and 32 are provided with removable closure valves 36, 37 and 38 respectively, which, when closed, as shown in Fig. 1 will prevent the passage of vapors through the respective conduits. Valves 36 and 37 are operated by a valve stem 39 which extends downwardly through the stuffing box 41 at the top of the reaction chamber and terminates in the upper end of the conduit 31. The valve stem 39 projects through central openings in the valve plates 36 and 37 and is maintained in axial alignment with the conduits 29 and 31 by guides 42 and 43 positioned within the conduits. The central openings in the valve plates 36 and 37 are somewhat larger in diameter than the valve stem to form a loose fit therebetween. Positioned below the closure plates 36 and 37 are ferrules 44 and 45 respectively, rigidly secured to the valve stem 39 adapted to lift the closure valves upon raising the valve stem.

This construction permits the closure plates to seat themselves properly on the vapor conduits regardless of any slight warping or misalignment of the valve stem and the ferrules may be caused to impart a hammer blow to the closure plates and insure loosening them even though the formation of solid deposits should tend to bind the closure plates to the conduits.

Directly above the closure plates 36 and 37 are stops 46 and 47 respectively, positioned to force the closure plates 36 and 37 downwardly toward ferrules 44 and 45 when the valve stem is in uppermost position and thus tend to loosen coke deposits which may form between the closure plates and valve stem and insures maintaining a loose sliding connection therebetween.

Closure valve 38 for vapor conduit 32 is likewise operated by a valve stem 48 extending through a conduit 49 extending through the upper catalyst bed 15 and through stuffing box 51 in the top of the reaction chamber. The closure valve 38 is mounted on the valve stem 48 and operated in the same manner as closure plates 36 and 37. The conduit 49 has a permanent closure plate 52 welded or otherwise connected therewith which is provided with a central opening through which valve stem 48 extends. The conduit 49 is preferably of the same diameter as the vapor conduits 29, 31 and 32.

The bottom catalyst bed is likewise provided with a blank conduit 53 of the same diameter as vapor conduits 29, 31 and 32 and is provided with a plate 54 to prevent the passage of vapors therethrough.

By providing blank conduits 49 and 53 passing through the upper and lower beds 12 and 15 respectively, each of the catalyst beds will have the same volume of catalyst per unit depth. Consequently, when the catalyst beds are of uniform depth each catalyst bed will have the same resistance to the flow of gases therethrough. This is of particular importance when the gases are caused to pass through the separate beds in parallel, such as during the regenerating period as hereinafter described. To insure that all of the beds are of uniform depth, a bench ring 55 secured to the interior wall of the chamber is provided for each catalyst bed.

As shown in Fig. 1, a heat exchange coil 56 may be located in each of the vapor zones 16 to 20 respectively, for supplying or removing heat during the process. Thus, during the cracking period, additional heat may be supplied to compensate for that lost by the cracking reaction. During the regenerating period, heat may be extracted by passing a cooling fluid through the coil. The exchange coil may, if desired, be positioned in the catalyst beds rather than in the vapor zones or may be omitted and the temperature otherwise controlled.

By the above construction, gases may be introduced into the catalyst chamber at a single point, passed through the separate catalyst beds in series or in parallel and withdrawn at a single point from the reaction chamber. For example, by operating valve stems 39 and 48 to close valve plates 36, 37 and 38 and by closing valves in conduits 22, 23 and 24, gases may be introduced at one end of the reaction chamber, through conduits 21 or 25, passed successively through each catalyst bed and withdrawn from the opposite end. By opening valve plates 36, 37 and 38 and closing valves in conduits 21, 25 and 24, gases may be introduced through central conduit 23 communicating with the central vapor space 17. A portion of the gases so introduced may pass downwardly through the lower intermediate catalyst bed 13, and may discharge through conduit 22.

Another portion may pass upwardly through the upper intermediate catalyst bed 14, then downward through conduit 32 to the outlet conduit 22. A further portion of the gas may pass directly upward through vapor conduit 29 to the upper end of the chamber and thence downwardly through the top catalyst bed 15 and thence through conduit 32 to the discharge conduit 22 and the final portion may pass downwardly through vapor conduit 31 thence upwardly through the lowest catalyst bed 12 after which it will combine with gases passing through the lower intermediate bed and will discharge through outlet conduit 22. By closing valve in conduit 22, and opening valve in conduit 24, the gases may be discharged through conduit 24 rather than 22.

It will be apparent that the flow of gases may be the reverse of that just described, namely, the gases may be introduced either through conduits 22 or 24 and discharged through 23. Also gases may be introduced to the chamber through the top or bottom conduits and after passing in parallel through the several beds be discharged through intermediate conduits 22 or 24 or vice versa.

For example, gases may be introduced through the upper conduit 25 and then take the following path. A portion may pass directly down through the upper bed 15 and discharge through conduit 24 or continue through conduit 32 and discharge through conduit 22. The remainder of the gases will pass through the upper vapor conduit 29, to the central vapor space 17 from which a portion will pass upwardly through the upper intermediate catalyst bed 14, another portion downwardly through the lower intermediate bed 13 and the remainder will pass through the lower vapor conduit 31 and thence upwardly through the lower bed 12 and discharge through conduits 22 or 24. Likewise the gases may be passed into the chamber through the lowest conduit 21, and, after passing in parallel through the respective catalyst bed, withdrawn either through conduits 22 or 24 or vice versa.

It will thus be apparent that the gases may be optionally introduced through any one of the conduits, passed in parallel through the beds and then withdrawn through any one of the other ports except of course that the gases cannot be introduced through one port and withdrawn through another port in direct communication with the entrance port by the internal vapor conduits. In each of the flows above described in which a parallel arrangement is obtained the gases pass in opposite directions through adjacent beds.

From the foregoing, it will be understood that the invention in its broader aspects is not limited to any specific flow through the various catalyst beds. When more than four catalyst beds are provided in each chamber, alternate vapor spaces are directly interconnected preferably by means of internal vapor conduits as hereinbefore described, to permit the gases to flow in parallel through the separate catalyst beds, and the intervening vapor spaces are interconnected to permit removal of the gases after passing through a single catalyst bed. The construction thus provides a simple and flexible means for permitting the gases to flow either in series or in parallel through the various catalyst beds.

In order to reduce the regenerating period to a minimum and thus reduce the time in which the reaction chamber is out of operation, it is desirable to pass the necessary volume of regenerating gases through the catalyst in the shortest possible time. However, the resistance of the catalyst mass to the passage of gases therethrough varies directly with the square of the velocity of the gases. By dividing the regenerating gases and passing separate portions through the individual beds in parallel rather than passing all of the gases through all of the beds in series, the velocity of gases passing through the individual beds is reduced in direct proportion to the number of catalyst beds employed, thus lowering pumping and equipment costs.

On the other hand during the reaction period, the yield of desired end products is a function of the time of contact of the gases with the catalyst mass which, for a reaction chamber of given dimensions, is determined by the linear velocity of the gases and the depth of catalyst through which they pass. The desired degree of conversion or in other words, yield of desired end products can be controlled therefore by modifying either the depth of catalyst mass for a given linear velocity or linear velocity of gases for a given depth of catalyst. As a practical matter, however, it is desirable to impart a minimum linear velocity to the gases sufficient to insure uniform distribution of the gases throughout the full cross-sectional area of the catalyst in all beds. To obtain the required time of contact without reducing the linear velocity below the desired minimum, the gases to be reacted may be passed, in series through the separate beds.

According to another phase of the invention, the gases to be reacted are passed through the separate beds in parallel and the required contact time is obtained at higher gas velocities by continuously recycling a portion of the products withdrawn from the chamber as hereinafter described.

The reaction chamber above described may be used in various types of treatments involving alternate treatment in the presence of a solid contact mass and regeneration of the mass in the same reaction chamber. It is of particular application, however, in the cracking of hydrocarbon oil and a diagrammatic illustration of the apparatus suitable for carrying out the cracking is shown in Fig. 4.

Referring now to Fig. 4, the oil to be cracked is introduced into the system through line 60 provided with a pump 61 which forces the oil to the heating coil 62 located in the furnace 63. The charging oil may be a crude petroleum, a reduced crude or a condensate stock and may be preheated by passing through heat exchangers, not shown, before being introduced into the heating coil.

The charging stock during its passage through the heating coil 62 is heated to a vaporizing temperature. This temperature may be of the order of 700 to 900° F.

The oil, after being heated to the desired vaporizing temperature in coil 62 is passed through transfer line 64 to a combined separating and fractionating tower 65 wherein vapors separate from unvaporized residue. The residue so separated is withdrawn through line 66. Steam may be injected into the bottom of the tower, as shown, to assist vaporization of the oil. The vapors after passing in contact with contact plates 67 for removal of entrained solids and liquids pass overhead through line 68 to a second heating coil 69 in furnace 70. The vapors during their passage through heating coil 69 are heated to a temperature which may range from 700 to 1000° F. depending upon the character of the stock being treated.

The oil vapors after being heated to the desired reaction temperature pass through transfer line 71 having branch lines 72 and 72' merging with conduits 21 and 21' respectively leading into the bottom of reaction chambers 10 and 10' respectively. These reaction chambers are duplicates and are constructed as previously described. For convenience, prime numbers will be employed to distinguish the like elements in chambers 10 and 10' and duplicate interconnecting lines.

When employing a clean condensate stock substantially free of unvaporizable constituents, the oil may be heated to the required reaction temperature in the first heating coil and passed directly to the reaction chambers through by-pass line 74 interconnecting lines 64 and 71. As a further alternative, the fresh charging stock may be heated to the desired reaction temperature within the first heating coil 62 and after passing through the combined separator and fractionating tower 65 for separation of unvaporized constituents, the vapors may be passed directly to the reaction chambers through by-pass line 75 without being passed through the second heating coil 69.

Branch lines 72 and 72' leading to reaction chambers 10 and 10' respectively, are provided with valves 77 and 77', so that the heated vapors may be passed to either reaction chamber as desired. For purpose of description, it will be assumed that the cracking operation is being carried out in reaction chamber 10 while regeneration is being accomplished in chamber 10', it being understood that each reaction chamber is alternately on the cracking and regenerating operation. Assuming that cracking is being accomplished in chamber 10, valve 77' in branch 72' will be closed and valve 77 in line 72 will be open. Also valves 79, 80 and 81 in conduits 22, 23 and 24 leading from chamber 10, will be closed, valve 82 in line 25 leading from the top of reaction chamber 10 will be open and valve plates 36, 37 and 38 in the internal vapor conduits (see Fig. 1) will be closed to prevent transfer of vapors therethrough.

The heated vapors pass upwardly through successive catalyst beds 12, 13, 14 and 15. The cracking catalyst may be of any type capable of bringing about the desired cracking reaction. By way of example hydrosilicates of alumina which are naturally active or which have been made active by suitable treatment, such as with acid may be employed to advantage, also synthetic gels consisting principally of silica and alumina may be employed. The time of contact of the oil vapors with the catalyst will depend upon the nature of catalyst used, the temperature maintained, the desired degree of conversion and other factors. In general, the time of contact may be of the order of from .15 to 5.0 volumes of liquid feed per volume of catalyst per hour. The oil after being subjected to the desired degree of cracking in the reaction chamber 10 is withdrawn through conduit 25 and passes through line 86 to a fractionating tower 87. A heat exchanger 88 may be provided in line 86 for partially cooling the cracked products before introducing the same into the fractionating tower 87. For example, the products may be cooled to a temperature ranging from 550 to 700° F.

The vapors introduced into the fractioning tower 87 are subjected to fractionation to condense insufficiently cracked constituents as reflux condensate. Liquid condensate formed in the fractionating tower 87 may be withdrawn from the tower through line 89 and may be removed from the system through line 91 or recycled to the heating coil 62 through line 92 and pump 93.

In lieu of withdrawing the total liquid products from the fractionating tower 87 through line 89 as described, the tower 87 may be provided with a trap out tray 94 communicating with line 95 whereby a lighter condensate fraction may be removed from the process through line 96, or it may be recycled through line 97, 92 and pump 93 to the inlet side of the heating oil coil 62 for further cracking treatment.

Vapors remaining uncondensed in the fractionating tower 87 pass overhead through line 98 to a condenser 99 wherein constituents boiling within the desired motor fuel boiling range are condensed. The products from the condenser 99 then pass to a receiver 101 wherein the liquid condensate separates from uncondensed vapor constituents. Gases separated in the receiver 101 pass through line 102 provided with a valve 103 which may be employed for imposing any desired back pressure on the fractionating tower 87 and catalyst chambers 10 and 10'. The pressure within the reaction chambers is preferably at substantially atmospheric except for the required back pressure to maintain the desired flow although a mild superatmospheric pressure of the order of 50 to 100 pounds per square inch may be used.

The gases removed through line 102 may be passed to a suitable recovery system for the removal of low boiling gasoline constituents. The liquid condensate collected in the receiver 101 is withdrawn therefrom through line 104 and passed to a storage tank (not shown) as a final distillate product of the process. This distillate may be subjected to any additional finishing treatment such as acid treating, clay treating, sweetening, hydrogenation or stabilization, or any combination of these treatments for conversion into the final finished motor fuel. A portion of the condensate withdrawn from the receiver 101 may be returned through line 105 to the top of the fractionating tower 87 as reflux therefor.

While the cracking operation is being carried out in the reaction chamber 10 as hereinbefore described, the catalyst contained in the reaction chamber 10' is subjected to regeneration to remove or burn off carbonaceous deposits formed during the cracking operation.

During regeneration, valve 82' in branch line 86', valve 81' in line 22' and valve 77' in line 72' will be closed while valve 80' in line 23' and valve 79' in line 24' will be open.

The catalyst is regenerated by the introduction of an oxidizing gas, for example, a mixture of air and diluent gases, such as steam or spent combustion gases. The regenerating gas is introduced into the system by means of a blower 106 which forces the regenerating gas through line 107 merging with branch lines 108 and 108' connected with lines 23 and 23' of chambers 10 and 10'.

The regenerating gas before being introduced into the reaction chamber 10' through the inlet conduit 23' is first preheated as hereinafter described to a temperature sufficient to initiate combustion of the solid carbonaceous deposits contained on the surface of the catalyst.

During regeneration, the internal valve plates 36', 37' and 38' in chamber 10' corresponding to valve plates 36, 37 and 38 in chamber 10 are in raised position so that the regenerating gases are caused to pass in parallel through the several beds of catalyst material positioned in the chamber as hereinbefore described.

The combustion gases resulting from regeneration are withdrawn from chamber 10' through outlet conduit 24' connected with manifold line 111'. These gases may be rejected from the system through valved line 112 but are preferably used as a diluent for the oxidizing gas. To this latter end, the gases from manifold 111' preferably pass to a reservoir 113 provided with a vent 114. The vented gases from line 112 or 114 may be sent to a heat recovery system such as a waste heat boiler (not shown) or to pressure turbines or both for recovery of energy therefrom.

The gases to be employed as a diluent are withdrawn from reservoir 113 through line 115. The gases so withdrawn after being reduced in temperature, such as by the introduction of a quenching medium, i. e., water through line 116, or after passing through a suitable heat exchanger (not shown) are forced by means of a blower 117 to admix with fresh regenerating gas introduced by blower 106 thereby suitably preheating it.

When the cracking operation in chamber 10 has reached a point where it becomes desirable to regenerate the catalyst and the catalyst in chamber 10' has been sufficiently regenerated, the chamber 10 is disconnected from the cracking circuit and interconnected with the regenerating circuit and the chamber 10' disconnected from the regenerating circuit and connected with the cracking circuit by reversal of the valves hereinbefore described.

This changing over of the respective chambers from a cracking operation to regeneration and vice versa may be accomplished for example in the following manner.

When the catalyst contained in the chamber 10' has been sufficiently regenerated, the air supply introduced by means of pump 106 is discontinued and inert gases, such as steam or combustion gases obtained during the regenerating operation, are continuously circulated through the chamber 10' by means of a circulating pump 117 to remove residual oxygen retained in the chamber 10'. In lieu of employing steam or other inert gases for purging the chamber of residual oxygen, the chamber may be connected to a vacuum pump through suitable lines not shown and the purging accomplished by evacuation.

When this is accomplished valves 79' and 80' are closed and valve stems 39' and 48' are lowered closing internal valve plates 36', 37' and 38' previously described, thus connecting the several catalyst beds in chamber 10' in series. Valve 77 in line 72 and valve 82 in line 86 are closed, disconnecting chamber 10 from the cracking circuit and the fractionating equipment. Simultaneously, valve 77' in line 72' and valve 82' in line 86' are opened thus connecting chamber 10' with the cracking circuit and fractionating equipment. Valve stems 39 and 48 in chamber 10 are then raised lifting valve plates 36, 37 and 38, opening internal conduits 29, 31 and 32, thus interconnecting the several catalyst beds in chamber 10 in parallel.

Valve 79 in line 24 and valve 80 in line 23 are then opened connecting chamber 10 with the regenerating circuit. Before introduction of the air into the regenerating circuit for commencing the regeneration, chamber 10 is purged of residual oil vapors by passing inert gas, such as steam, through the chamber or evacuating it as hereinbefore described. The residual oil vapors removed from chamber 10 during the purging treatment are preferably fractionated by suitable fractionating equipment (not shown) to recover the oil constituents therefrom.

When the oil vapors have been completely purged from the chamber 10, regeneration of the chamber is begun as hereinbefore described with reference to chamber 10'. The amount of air introduced into the regenerating gases is regulated to control the temperature maintained during the regeneration.

As described, the apparatus illustrated in Fig. 4 is adapted primarily for direct series flow of oil vapors to be cracked and parallel flow of regenerating gases through the reaction chamber.

The apparatus lends itself readily, however, to parallel flow of both cracking and regenerating gases or to intermediate recycling of the oil vapors to be cracked. Such a system is illustrated in Fig. 5. For simplicity, the vaporizing equipment has been omitted from Fig. 5, it being understood that the equipment shown in Fig. 4 or any suitable apparatus may be employed for vaporizing the oil and for bringing it to the required reaction temperature. The reaction chambers shown in Fig. 5 are of the same construction as in Figs. 1 and 4 and bear the same reference characters.

The system illustrated in Fig. 5, however, has been modified to permit more flexible control of the oil vapors to be cracked. According to the modification shown in Fig. 5, a part of the gases passing through the reaction chamber are withdrawn through the side conduits, subjected to additional heating and returned to the reaction chamber. As shown, the heat of the regenerating gases withdrawn from another chamber may be employed for supplying additional heat to the oil vapors being recirculated to the reaction chamber.

Referring to Fig. 5, the oil vapors to be cracked after being vaporized and heated to the desired reaction chamber in suitable apparatus, not shown, are introduced into the system through line 120 from whence they may pass through line 121 having a valve 122 to a manifold line 123, having valved branch lines 124 and 125 leading to the bottom of reaction chambers 10 and 10' respectively.

As distinguished from the mode of operation described in connection with Fig. 4 the external valves 79, 80 and 81 in conduits 24, 23 and 22 respectively, of reaction chamber 10 and valves 79', 80' and 81' in corresponding lines 24', 23' and 22' of reaction chamber 10' remain open during the cracking period and oil vapors are continuously removed, heated and recirculated back to the reaction chamber. It will be noted that lines 24 and 22 leading from reaction chamber 10 and corresponding lines 24' and 22' leading from reaction chamber 10' connect to a common manifold so that the oil vapors may be withdrawn from either or both of these lines during the cracking period as later described.

According to this modification, lines 24 and 22 leading from reaction chamber 10 communicate with lines 126 and 126' having a valved branch line 127 leading to a heat exchanger coil 128 located within a heat exchanger 129 and another valved branch line 130 leading to space surrounding the heat exchange coil 128. Products from the heat exchange coil 128 pass through line 132 to the suction side of a blower 133 which forces the oil vapors through a return line 134 having valved branch line 135 leading through line 136 to line 23 communicating with the central part of the reaction chamber 10 and another valved branch line 137 connecting with line 138 merging with line 23' leading to the central part of the reaction chamber 10'.

Lines 24' and 22' interconnect with line 139 having a valved branch line 140 connecting with the inlet side of the heat exchange coil 128 and another valved branch line 141 connecting with the space surrounding the heat exchange coil 128.

Gases after passing around the heat exchange coil 128 exit through line 142. A part of the gases may be vented from the system through valved line 143, and the remainder is passed to the suction side of a blower 144 which forces the gases through line 145 having a valved branch line 146 connecting with line 136 between the valves thereof and the line 84 leading to chamber 10. Another valved branch line 147 interconnects line 145 with line 138 communicating with line 84' leading to chamber 10'.

Regulated amounts of air, to control regeneration temperature, are introduced into the gases cycled to the chamber undergoing regeneration through line 148 connecting with line 142 on the suction side of the blower 144. Also, if the regenerating gases recycled to the regenerating chamber are insufficiently cooled during passage through the heat exchanger 129 they may be further cooled either by cooling coils, not shown, or by direct injection of steam or water through line 149.

The system as above described makes it possible to utilize blower 133 for recirculating vapors undergoing cracking and blower 144 for circulating regenerating gases to either of the two reaction chambers as desired. Assume, for example, the chamber 10 is on the cracking stream whereas chamber 10' is undergoing regeneration. In such case, the valves in branch lines 130, 137, 140 and 146 are closed and valves in branch lines 127, 136, 141 and 147 are open.

Oil vapors withdrawn through either or both conduits 22 and 24 of chamber 10 pass through lines 126 and 127 to the heating coil 128 in heat exchanger 129 where they are further heated by regenerated gases from chamber 10'. The oil vapors after passing through the heat exchange coil 128 are withdrawn through line 132 connected to the suction side of blower 133 which forces them through lines 134, 136 and 84 to the chamber 10 through central port 23.

Meanwhile regenerating gases are withdrawn from chamber 10' through either or both conduits 24' and 22' and pass through lines 139 and branch line 141, to the space surrounding the heat exchange coil 128. If desired, additional air may be added at this point to burn any carbon monoxide that may be present in the regenerating gas. The regenerating gases on passing through the heat exchanger give up part of their heat to the oil vapors passing through the heat exchange coil 128. The combustion products emerge from heat exchanger 129 through line 142. Excess gases over and above that required for preheating and diluting the air the desired amount are vented from the system through line 143. The remainder, with or without additional cooling, after being blended with the required amount of air to effect controlled regeneration is forced by means of blower 144 through line 145, branch line 147 and line 138, to central conduit 23' of reaction chamber 10'.

In lieu of adding additional air through line 148, all the required amount of air may be added to the regenerating gases entering the heat exchanger 129.

When it is desired to crack in chamber 10' and regenerate in chamber 10, the position of the valves above described will be reversed. It will be understood that both after the cracking and regenerating periods the chamber will be purged of residual gases either by steam or evacuation as described with reference to the process illustrated in Fig. 4 before changing over to the other period.

When chamber 10' is on the cracking stream and chamber 10 is undergoing regeneration, recirculating oil vapors exit through either or both conduits 24' and 22' to line 139 from whence they pass through branch line 140 to the heat exchange coil 128. From heating coil 128 the heated vapors pass through line 132, blower 133, line 134, branch line 137, line 138 and line 84' back into reaction chamber 10'.

Meanwhile, regenerating gases emerge from chamber 10 through either or both ports 24 and 22 to line 126. From line 126 they are conducted through branch line 130 leading to the space surrounding the heat exchanger coil 128, in which they pass in heat exchange relation with heat exchange coil 128. From heat exchanger 129, the products pass through 142 and after venting excess gases through line 143 and combined with required amount of air are forced by blower 144 through line 145, branch line 146, line 136 and 84 back into reaction chamber 10.

In its broader phases, the invention is not restricted to effecting heat exchange between the regenerating gases and recirculating oil vapors. The invention in its broader aspects contemplates other methods of heating the recirculating gases and other methods of extracting heat from the regenerating gases.

Returning now to the cracking operation, the apparatus illustrated in Fig. 5 permits a flexible control of the cracking treatment involving a number of modes of operation.

When recirculating a portion of the vapors undergoing cracking as heretofore described, the internal valves may be maintained open or closed during the cracking operation, or valve plates 36 and 37 open and valve 38 closed or vice versa.

According to one mode of operation illustrated in Fig. 5, the oil to be cracked is introduced into the bottom of the reaction chamber through the charge lines 120, 121, 123 and then through either 124 or 125. The cracked product, after undergoing the desired conversion, may be passed from the reaction chambers to the fractionating tower 87 through lines 86 or 86'. When operating in this manner with internal valves closed, valve 81 in outlet conduit 22 and valve 80 in conduit 23 leading into the central section of the reaction chamber may be opened so that a portion of the vapors after passing through the initial catalyst bed is withdrawn from the chamber, passed through the heating coil 128 and returned to the reaction chamber through line 23.

The cracked vapors after being reintroduced into the central section of the reaction chamber will divide, a portion passing downwardly through the lower intermediate catalyst bed and the remainder passing upwardly through the upper intermediate catalyst bed. Further recirculation may be obtained by opening valves 79 in outlet line 24 leading from the vapor zone disposed between the top and upper intermediate catalyst bed. When this valve is opened a portion of the vapors after passing through the upper intermediate catalyst bed will continue through the upper catalyst bed from whence they will pass through lines 25 and 86 to the fractionating tower 87. The remainder of the vapors will be withdrawn through line 24 and recycled through the heating coil 128. When operating in this manner, the vapors to be cracked must first pass through the lower catalyst bed before being subjected to recirculation through the heating coil and all of the vapors passing to the fractionating tower 87 must pass through at least three catalyst beds.

In lieu of recirculating vapors from both lines 22 and 24 valve 81 may be closed and valve 79 opened. In this case, the fresh vapors must pass through the three lower beds before being recirculated. In such case, recirculation is accomplished only through the upper intermediate catalyst bed.

When valve 81 is open and valve 79 closed, recirculation is acomplished only through the lower intermediate catalyst bed.

Rather than having both valves 79 and 81 opened, either one of the two may be closed and the internal valve 38 in conduit 32 (see Fig. 1) may be opened, thus providing communication between the lower intermediate vapor zone 16 and upper intermediate vapor zone 18. In such case, recirculation is accomplished in both intermediate catalyst beds.

As a further alternative, all of the internal valves within the reaction chamber may be maintained open during the cracking operation. According to this mode of operation, recirculation of the vapors is accomplished throughout all four of the catalyst beds. When operating in this manner, the relative volume of gases being recirculated as compared with the amount of gases being introduced into the reaction chamber should be so high that only a negligible amount of the fresh vapors are by-passed directly through the catalyst chamber through internal ducts 29 and 31.

Instead of introducing the vapors to be cracked into the bottom of the chamber, a part or all may be introduced into the recirculating circuit through line 150 connecting charge line 120 with line 132 on the suction side of the blower 133. If additional heating of the charge vapors is desired, the fresh oil vapors may be passed through line 151 communicating with line 127 on the inlet side of the heating coil 128. Also in lieu of passing the cracked products from the top of the reaction chambers to the fractionating towers, a portion or all of the products passing to the fractionating tower 87 may be withdrawn from the recirculating lines through branch line 153 connecting recirculating line 126 of the tower 10 with the fractionating tower or line 154 interconnecting recirculating line 139 of the reaction chamber 10' with the fractionating tower. When operating in this manner, it is unnecessary to provide internal valves for the conduits 29, 31 and 32.

It will be understood that the products introduced into the fractionating tower will be subjected to the desired fractionation and subsequent treatment as set forth in more detail in the description of Fig. 4.

For simplicity, only two chambers have been illustrated for carrying out the alternate reaction and regeneration treatment. In practice, however, it will be understood that any desired number may be employed depending on the required capacity of the equipment and the relative time involved in the reaction period as compared with that necessary for regeneration and purging the chambers before and after the regenerating operation.

While the apparatus has been described with reference to the catalytic cracking of hydrocarbon oil, it will be understood that it will have a more general application, such as, for example, the filtration of hydrocarbon oils, the clay treatment of cracked distillates, catalytic reforming of naphthas, the desulfurization of petroleum distillates, the polymerization of hydrocarbons the destructive or non-destructive hydrogenation of hydrocarbon oils and the synthesis of hydrocarbons from carbon monoxide and hydrogen, etc. In all of these operations above mentioned, the catalyst more or less gradually becomes fouled with carbonaceous deposits making it desirable to periodically regenerate the catalyst mass by one means or another to improve activity thereof.

Having thus described the preferred embodiment, it is understood that this invention embraces such other variations and modifications as come within the spirit and scope thereof.

This case is filed as a division of our application Serial No. 235,232, filed October 15, 1938, for Process and apparatus for cracking oils, now Patent No. 2,311,318, granted February 16, 1943.

We claim:

1. In a method of catalytic conversion of hydrocarbons wherein one reaction vessel having stationary catalyst is used for conversion of hydrocarbons and a second similar reaction vessel is on regeneration to regenerate fouled catalyst by burning, the steps of introducing regenerating gas into said second vessel, withdrawing hot regeneration gases from said second vessel, cooling withdrawn regeneration gases by indirect heat exchange with hot hydrocarbons withdrawn from said first vessel, additionally cooling at least part of the withdrawn cooled regeneration gases and recycling at least part of the additionally cooled regeneration gases to said second vessel to control the temperature during regeneration, and recycling the heated hydrocarbon vapors leaving said heat exchange step to said first vessel to undergo additional conversion therein.

2. In a method of catalytic conversion of hydrocarbons wherein one reaction vessel having spaced beds of catalyst is used for conversion of hydrocarbons and a second similar reaction vessel is on regeneration to regenerate the fouled catalyst in situ by burning, the steps of passing hot hydrocarbons through at least one bed of catalyst in said first vessel, withdrawing and heating the resulting hydrocarbons from said first vessel by passing them in indirect heat exchange with hot regeneration gases withdrawn from said second reaction vessel which has been used for the conversion of hydrocarbons and in which catalyst is undergoing regeneration, returning the heated hydrocarbons to said first reaction vessel and passing them through at least one bed of catalyst in said first reaction vessel, additionally cooling the regeneration gases leaving said heat exchange step, and recycling at least a part of the additionally cooled regeneration gases to said second vessel undergoing regeneration to control the temperature during regeneration.

3. In a method of catalytic conversion of hydrocarbons wherein one reaction vessel having spaced beds of catalyst is used for conversion of hydrocarbons and a second similar reaction vessel is on regeneration to regenerate the fouled catalyst in situ by burning, the steps of passing hot hydrocarbons through at least one bed of catalyst in said first vessel, withdrawing and heating the resulting hydrocarbons from said first vessel by passing them in indirect heat exchange with hot regeneration gases withdrawn from said second reaction vessel which has been used for the conversion of hydrocarbons and in which catalyst is undergoing regeneration, returning the heated hydrocarbons to said first reaction vessel and passing them through at least one bed of catalyst in said first reaction vessel, quenching by direct injection of water the regeneration gases leaving said heat exchange step, and recycling at least a part of the quenched regeneration gases to said second vessel undergoing regeneration to control the temperature during regeneration.

4. In a method of catalytic conversion of hydrocarbons in a system wherein one reaction vessel having spaced beds of catalyst is used for conversion of hydrocarbons by an endothermic reaction, and a second similar reaction vessel is on regeneration to regenerate the fouled catalyst in situ by burning at a temperature substantially in excess of that at which the said endothermic reaction takes place, the steps of passing hot hydrocarbons through at least one bed of catalyst in said first vessel whereby the said hydrocarbons are lowered in temperature, withdrawing and heating the resulting hydrocarbons from said first vessel by passing them in indirect heat exchange with hot regeneration gases withdrawn from said second reaction vessel which has been used for the conversion of hydrocarbons and in which catalyst is undergoing regeneration, introducing a fresh charge of hydrocarbons into the heated hydrocarbons leaving said heat exchange step, returning the resultant mixture of hydrocarbons to said first reaction vessel and passing them through at least one bed of catalyst in said first reaction vessel to produce additional conversion of said heated hydrocarbons, and recycling at least a part of the regeneration gases leaving said heat exchange step to said second vessel for the purpose of controlling the temperature of the catalyst during regeneration.

5. In a method of catalytic conversion of hydrocarbons in a system wherein one reaction vessel having spaced beds of catalyst is used for conversion of hydrocarbons by an endothermic reaction, and a second similar reaction vessel is on regeneration to regenerate the fouled catalyst in situ by burning at a temperature substantially in excess of that at which the said endothermic reaction takes place, the steps of passing hot hydrocarbons through at least one bed of catalyst in said first vessel whereby the said hydrocarbons are lowered in temperature, withdrawing the resulting hydrocarbon from said first vessel and mixing the same with fresh hydrocarbon charge, heating the resultant mixture of hydrocarbons by passing them in indirect heat exchange with hot regeneration gases withdrawn from said second reaction vessel which has been used for the conversion of hydrocarbons and in which catalyst is undergoing regeneration, returning the heated hydrocarbons to said first reaction vessel and passing them through at least one bed of catalyst in said first reaction vessel to produce additional conversion of said heated hydrocarbons, and recycling at least a part of the regeneration gases leaving said heat exchange step to said second vessel for the purpose of controlling the temperature of the catalyst during regeneration.

CHARLES W. TYSON.
HERBERT G. M. FISCHER.
EGER V. MURPHREE.

REFERENCES CITED

The following references are of record in the file of this patent:

UNITED STATES PATENTS

| Number | Name | Date |
|---|---|---|
| 1,989,692 | Houdry | Feb. 5, 1935 |
| 2,006,552 | Heid | July 2, 1935 |
| 2,081,348 | Angell | May 25, 1937 |
| 2,143,949 | Keith, Jr. | Jan. 17, 1939 |
| 2,167,602 | Schulze | July 25, 1939 |
| 2,239,801 | Voorhees | Apr. 29, 1941 |
| 2,265,964 | Carpenter | Dec. 9, 1941 |
| 2,276,249 | Morrell | Mar. 10, 1942 |
| 2,278,509 | Brown | Apr. 7, 1942 |
| 2,290,580 | Degnen et al. | July 21, 1942 |
| 2,295,752 | Parkhurst | Sept. 15, 1942 |

FOREIGN PATENTS

| Number | Country | Date |
|---|---|---|
| 357,956 | Great Britain | Sept. 29, 1930 |